United States Patent [19]

Thanawalla et al.

[11] Patent Number: 4,618,703
[45] Date of Patent: Oct. 21, 1986

[54] PRODUCTION OF THE ACRYLATES AND METHACRYLATES OF OXYALKYLATED ALLYL ALCOHOL

[75] Inventors: Chandrakant B. Thanawalla, Exton; David C. Dehm, Thornton, both of Pa.

[73] Assignee: Atlantic Richfield Company, Los Angeles, Calif.

[21] Appl. No.: 775,898

[22] Filed: Sep. 13, 1985

[51] Int. Cl.$^4$ ............................................. C07C 67/26
[52] U.S. Cl. ................................. 560/209; 522/181; 522/103; 525/532; 525/922; 526/292.3; 526/320; 560/219; 560/224; 560/225
[58] Field of Search ........................... 526/292.3, 320; 560/209, 219, 224, 225; 204/159.22

[56] References Cited

U.S. PATENT DOCUMENTS 3,001,975 9/1961 Beavers ............................... 560/225
4,382,135 5/1983 Sinka .................................. 526/320

Primary Examiner—Paul R. Michl
Attorney, Agent, or Firm—Michael S. Jarosz

[57] ABSTRACT

Production of a reaction mixture comprising the multi-functional acrylates, methacrylates or halogenated derivatives thereof of oxyalkylated allyl alcohol characterized as being free of odor typical of allyl compounds, not lachrimatory and substantially reduced skin irritation as compared with acrylates and methacrylates of allyl alcohol. The acrylate and methacrylate compositions of the invention are useful as radiation-crosslinkable diluents for radiation-hardenable compositions (binders).

14 Claims, No Drawings

PRODUCTION OF THE ACRYLATES AND METHACRYLATES OF OXYALKYLATED ALLYL ALCOHOL

BACKGROUND OF THE INVENTION

1. Field of the Invention

This invention relates to the production of polymerizable compositions comprising the reaction product of an acrylic monomer such as acrylic or methacrylic acid or their anhydrides or acid chlorides, with an oxyalkylated allyl alcohol, such as an ethoxylated or propoxylated allyl alcohol, each having a relatively low degree of oxyalkylation, which compositions are useful as radiation-crosslinkable diluents for radiation-hardenable compositions.

2. Description of the Prior Art

Radiation-hardenable coating compositions are well known in the art. Monomers typically used heretofore for such purpose include acrylic acid esters of 1,6-hexane diol, diethylene glycol, 1,4-butanediol, trimethylolpropane, pentaerythritol or glycerol. Polyethylene and triethylene glycol diacrylates are disclosed as constituents in photopolymerizable compositions, for example, in U.S. Pat. Nos. 2,951,758 and 3,060,023 and neopentyl glycol acrylate compositions are disclosed for bonding metals in U.S. Pat. No. 3,125,480.

The nature and proportion of these comonomeric acrylic acid esters in binders (oligomers) may influence the chemical and physical properties of the resultant hardened films, for example, reactivity, viscosity, hardness, adhesion, and elasticity. In this connection, it is known, for example, that hexanediol-bis-acrylate effectively reduces the viscosity of a resin, but at the same time exhibits an adverse effect upon the reactivity of the binder. In contradistinction, it has been reported that trimethylolpropane triacrylate has only a slight effect upon the reactivity of the binder, but it is unable sufficiently to reduce the viscosity, and at the same time, imparts greater hardness but also poor adhesion to the film on account of the relatively high cross-linking density. Furthermore, it is known that monomer diluents containing the allyl group, including, for example, allyl acrylate and allyl methacrylate, exhibit strong, pungent disagreeable odors, are lachrimatory, and are severe skin irritants, thereby limiting their practical use in binder formulations.

Photopolymerizable compositions comprising a thermoplastic macromolecular organic polymer binder, an addition polymerizable branched chain polyol polyester of an alphamethylene carboxylic acid of 3-4 carbon atoms, e.g. polyoxyethyltrimethanolpropane triacrylate or trimethyacrylate and polyethylpentaerythritol tetraacrylate or tetramethyacrylate, having average molecular weights of at least about 450 and an addition polymerization initiator activable by actinic radiation are described in U.S. Pat. No. 3,380,831. The presence of the ether group as a repeating unit in the additive polymerizable compounds renders these monomers hydrophilic and less soluble in oils, which in turn reduces skin diffusion resulting in lower toxicity. It is also known, from U.S. Pat. No. 3,368,900, that triacrylates are capable of production from reaction products of trimethylolpropane and up to about 20 moles of ethylene oxide, which are useful for photopolymerization reactions.

More recently, radiation-cross linkable diluents consisting of a mixture of triacrylates of a reaction product of trimethylolpropane and ethylene oxide with an average degree of ethoxylation of from 2.5 to 4, and having a particular product disribution have been disclosed in U.S. Pat. No. 4,180,474. However, it is also known, for example, from U.S. Pat. No. 4,088,498 that compounds free from ether linkages are preferred for such purpose.

SUMMARY OF THE INVENTION

An object of the present invention is to provide non-lachrimatory, radiation-hardenable diluents for radiation-hardenable binders (oligomers) which exhibit reduced skin irritation properties, without having an adverse effect upon the reactivity or upon the properties of the resulting hardened products. A further object of the present invention is to provide radiation-hardenable compositions containing radiation-hardenable diluents having multiple terminal functionality which exhibit improved flexibility, solvent and scuff-resistance and adhesion to substrates on which such compositions are coated.

According to the invention, this object is achieved by the production and use of acrylic and methacrylic acid esters of oxyalkylated allyl alcohol, particularly those characterized as having a relatively low degree of alkoxylation, generally between about 1 and about 3 moles of alkoxylate per mole of allyl alcohol, which esters are characterized as being free of disagreeable allyl compound odor and non-lachrimatory. Accordingly, the present invention is concerned with the production of radiation-hardenable diluents for radiation-hardenable binder compositions based on acrylic and methacrylic acid esters of reaction products of an allyl alcohol and a specified alkylene oxide, such as ethylene oxide, propylene oxide and butylene oxide, or mixtures thereof, the radiation-hardenable diluent comprising an admixture of the acrylates or methacrylates of the reaction product of allyl alcohol and said alkylene oxide, generally present in an amount of between about 1 and 20 moles, and preferably between about 1 and about 3 moles, per mole of allyl alcohol. These diluents may also be termed alkylene oxide adducts of allyl alcohol, and, in general, correspond to the formula:

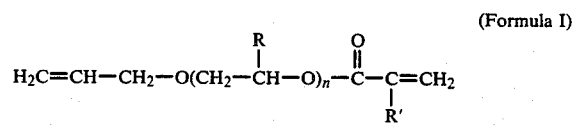

(Formula I)

wherein R is hydrogen or an alkyl radical selected from the group consisting of methyl and ethyl; R' is hydrogen, methyl or halogen such as a chloro, fluoro or bromo radical; and n is an integer of from 1 to 20, preferably from 1 to 3.

The alkylene oxide adducts of allyl alcohol of the present invention may be prepared by known methods, for example, by alkoxylation of allyl alcohol at elevated temperatures, generally between about 100° C. and 150° C. in the presence of an alkaline catalyst, such as an alkali metal hydroxide, illustratively, potassium hydroxide, present in a concentration ranging between about 0.05 and about 0.5 percent by weight, of the reactants. In general, by such procedure, allyl alcohol is heated to a temperature not greater than its boiling point, and a suitable amount of alkaline catalyst is added. A controlled amount of ethylene oxide, propylene oxide, butylene oxide or an admixture thereof, is slowly contacted with the preheated allyl alcohol over a reaction time ranging, generally, up to about 20 hours and in amount sufficient to form the desired oxyalkylated reaction product mixture. If desired, the oxyalkylation of allyl alcohol may be carried out in a suitable solvent, such as an aromatic hydrocarbon, illustratively, toluene or benzene, or alternatively, an aliphatic hydrocarbon solvent containing of from about 5 to 12 carbon atoms, such as heptane, hexane, octane and the like, thereby obviating the potential toxic associations connected with use of aromatic hydrocarbon solvents. It is also necessary to ensure that the allyl alcohol reactant is free of water, and hence, vacuum stripping of the starting material may be employed in conventional manner.

The acrylic or methacrylic acid esters of the alkoxylation reaction product may also be produced by known methods, for example, by direct esterification with acrylic acid or by azeotropic esterification, with an aromatic compound employed as a water entraining agent, in the presence of suitable catalyst and stabilizer. Also employable are methacrylic acid, or the anhydrides or acid chlorides of acrylic acid or methacrylic acid. The esterification reaction is generally carried out at temperatures ranging from between about 50° C. and about 150° C., and preferably from about 90° C. to about 100° C. The molar ratio of acid compound to alkoxylated allyl alcohol may range from about 2:1 to 10:1, preferably between about 2 and about 2.5, per mole of alkoxylated allyl alcohol. In general, the reaction is effected in the presence of an acid catalyst, such as sulfuric acid, p-toluene sulfonic acid, phosphoric acid, hydrochloric acid, or an organic acid such as methanesulfonic acid, present in an amount from about 0.1 percent to about 5 percent, by weight of the reactants. In general, a free-radical inhibitor is also present during the reaction to prevent gelling. Any free-radical inhibitor known in the art for this purpose may be employed, such as hydroquinones, methylquinone, p-methoxyphenol, and the like, the inhibitor generally being present in an amount from about 0.1 percent to about 5 percent, by weight of the reactant composition.

The reaction is carried out by charging the aforestated reactants into a suitable reactor and heating the reaction mixture to the desired esterification temperature while collecting water of esterification resulting from the esterification reaction. If desired, a solvent for the reaction such as an aliphatic or an aromatic hydrocarbon, as above specified, may be employed in the esterification reaction. Upon completion of the esterification reaction, the crude ester reaction product is generally washed with a basic solution and neutralized. If desired the treated ester solution may be clarified by treatment in conventional manner with an acidified clay, and finally stripped of solvent by vacuum distillation.

The terminally ethylenically unsaturated acrylate and methacrylate reaction products produced in accordance with the present invention are free of odor, typical of alkyl compounds, non-lachrimatory, and exhibit reduced skin irritation, when employed as diluents in reaction with radiation-hardenable binder compositions; such binder compositions may also exhibit improved adhesion, scuff and solvent resistance, as well as improved flexibility, depending upon the oligomer system employed.

The radiation-hardenable compositions of the present invention may be cured by means of high-energy radiation, such of UV-light, electron beam, gamma rays, etc. but preferably by UV-light.

It is generally essential to employ a small amount of a photoinitiator when polymerization of the radiation-hardenable compositions of the invention is effected in the presence of UV light, or by plasma arc radiation (i.e. by actinic light generally). In general, radiation-hardenable compositions to be cured by electron beam or x-ray radiation do not require a photoinitiator. The photoinitiator employed may be one of any conventionally used for this purpose. Illustrative photoinitiators employable include: benzil, benzoin; benzoin alkylethers; acryloin derivatives; in general, benzophenone, including derivatives thereof such as alkyl-substituted benzophenones, halogen methylated benzophenone, halogenated benzophenones; anthraquinone, including derivatives of anthraquinone, such as tertiary butyl anthraquinone or carboxylic esters thereof; acetophenone, including oxime esters and alkoxy-substituted derivatives thereof, xanthones, thioxanthones, and Michler's ketone. Other compounds used as photoinitiators for this purpose are those set forth in Table 5–13 page 132 "Molecular Photochemistry" by N. J. Turro (W. Benjamin, Inc., 1967).

In general, the aforementioned photoinitiators are employed in quantities of about 0.1 to about 10 percent, by weight, and preferably from about 1 to about 5 percent, by weight, of the radiation-hardenable composition. In addition, if desired, additives to produce increased reactivity may be included with the aforementioned photoinitiators. Additives conventionally employed for such purpose include phosphines, thioethers, tertiary amines and the like, generally employable in quantities ranging up to about 5 percent, by weight, based on the radiation-hardenable compositions.

The radiation-hardenable compositions containing the oxyalkylated allyl alcohol acrylate and methacrylate monomers or halogenated derivatives thereof, of the present invention comprise a binder (oligomer) together with said monomer and contain a minor amount of a polymerization inhibitor in order to stabilize the unsaturated contained compositions in storage. Illustrative oligomers employed for this purpose comprise reaction products of at least one polyepoxide containing more than one 1–2 epoxide group per molecule and acrylic and methacrylic acid or mixtures thereof, about 0.6 to 1 mole of carboxyl groups having been used per epoxide group. The polyepoxides may have also been pre-extended or modified with ammonia, aliphatic or cycloaliphatic primary or secondary amines, hydrogen sulfide or aliphatic, cycloaliphatic, aromatic or araliphatic dithiols or polythiols, with dicarboxylic acid and polycarboxylic acids, from 0.01 to 0.6 amino, thio, or carboxyl equivalents having been used per epoxide equivalent.

The reaction products described above may be optionally modifed by reaction with an isocyanate. The radiation-hardenable compositions also may include reaction products of alkoxylated alcohols, phenols, or amines, and acrylic or methacrylic acid. The radiation-hardenable compositions may also include the class of unsaturated polyesters which contain radiation-hardenable unsaturated carboxylic acids, such as maleic acid and fumaric acid in condensed form. In addition, reaction products of diisocyanates and polyisocyanates with hydroxyalkyl acrylates and methacrylates or other urethanes containing acrylic and/or methacrylic acid units may likewise to employed. Further, diluents of the invention may also be admixed with thermoplastic and/or thermosetting polymers prior to subjection of the resulting admixtures through radiation hardening. The admixing of thermoplastic or thermosetting polymers and radiation-hardenable compositions and monomer diluents of the invention is effected in conventional manner.

The multiple functional diluents of the invention are generally present in the radiation-hardenable binder admixture compositions in an amount of from about 5 to 80 percent, by weight of the total composition, and preferably in an amount of from about 10 to about 70 percent by weight of the total admixture.

Polymerization inhibitors employed in formulation of the radiation-hardenable compositions produced from the monomers of the invention are, in general, well known. Suitable compounds for effecting such purpose include phenols, hydroquinone, alkyl- and aryl-substituted hydroquinones and quinones, tertiary butyl catechol, pyrogallol, copper compounds such as copper resinate and cuprous chloride, naphthylamines, beta-naphthol, 2,6-ditertiary butyl p-cresol, phenothiazine, pyridine, nitrobenzene, dinitrobenzene, p-toluquinone and chloranil. In general, such stabilizers are employed in quantities ranging from about 0.001 to about 0.5 percent by weight based on the total weight of the radiation-hardenable composition.

Depending upon the ultimate application of the radiation-hardenable composition, various dyes, pigments, thermographic compounds and color-forming components may be added to the radiation-hardenable composition to give varied results. These additive materials, however, preferably should not absorb excess amounts of light at the exposure wave length or inhibit the polymerization reaction desired.

The radiation-hardenable compositions containing the multiple functional monomer diluents of the invention are suitable for use as coating and impregnating compositions for paper, cardboard, plastics, wood, leather, metals, textiles and ceramic materials. These compositions may also be employed as binders for printing inks, photoresists for the production of screen printing forms, screen printing compositions, adhesives for pressure sensitive tapes, decals and laminates.

The invention is further illustrated by, but is not intended to be limited to the following examples, wherein the parts and percentages are by weight.

EXAMPLE I (A) Preparation of propoxylated allyl alcohol with a degree of propoxylation of 2.

Liquid allyl alcohol in an amount of 2,554 parts, is charged to a stainless steel autoclave equipped with a stirrer, thermometer and valve to control introduction of propylene oxide, and is heated to approximately 95° C. Water is removed under vacuum and a catalyst solution comprising 4.88 parts of potassium hydroxide, preheated to a temperature of about 75° C. to 100° C., is charged hot into the autoclave. Following completion of the addition of allyl alcohol, the reactor is purged with dry nitrogen. The reactor is maintained at 95° C. and dry propylene oxide, in an amount of 2,847 parts, is slowly added over a period of 24 hours using a pressure demand control valve system to control the addition rate. A reference pressure is set to ensure charging of propylene oxide at a pressure of about 10 psig; when the pressure increases to greater than 10 psig, the valve is closed. The reaction temperature is held between 95° C. and 100° C. in order to prevent excessive unsaturated material in the product polyol. The monomer product is removed hot from the reactor and is treated with Magnesol in an amount of 4 grams per 250 grams of monomer, and is stirred for 2 hours at 100° C. in order to remove catalyst. The resulting product is vacuum filtered through a Celite bed to provide the desired propoxylated allyl alcohol having a degree of propoxylation (average number of moles of propylene oxide per mole of allyl alcohol) of 2.

(B) Preparation of the acrylate of the propoxylated allyl alcohol obtained in Part A.

The adduct obtained in Part A of this Example I is acrylated by the direct esterification method as follows: To a 2 liter round bottom 4 neck flask equipped with stirrer, thermometer, air sparge tube, Dean-Stark adapter and reflux condenser there is added 348 parts of propoxylated allyl alcohol described above, 162 parts of glacial acrylic acid, 300 parts of n-heptane, 0.4 parts of p-hydroquinone (HQ) and 9 parts of methanesulfonic acid (70% aqueous). Air is sparged through the reaction mixture while heating and collecting the water of esterification over a 13 hour period of esterification. At the end of this period, an amber crude ester solution is obtained. The crude ester solution is cleansed by washing several times with a 25% caustic solution, followed by salt and sodium thiosulfate solution treatment to destroy any peroxides present in the crude ester solution. This treated ester solution is clarified with 1% of acdified clay (based on the weight of the solution) and finally is stripped free of n-heptane solvent under 30–50 mm Hg° vacuum at a pot temperature not exceeding 80° C. Prior to stripping, 0.4 parts of monomethylether of hydroquinone (MEHQ) is added, as inhibitor. The product is analyzed by gas chromotography for distribution of the propoxylation portion of the acrylate, and is subjected to infra-red analysis and viscosity determination by conventional methods. The yield of product obtained, the acrylate of the reaction product of allyl alcohol with two moles of propylene oxide, represents 85% of the theoretical yield, based on the propoxylated allyl alcohol, and is characterized as being free of odor typical of allyl components and is not lachrimatory.

EXAMPLE 2

(A) Preparation of the adduct of allyl alcohol and two moles of ethylene oxide.

Employing the procedure described in Example 1(A), above, 5 parts of potassium hydroxide are added to 2,709.6 parts of allyl alcohol and the resultant admixture is charged in the stainless steel autoclave. The mixture is heated at 78° C. while 2,291.3 parts of ethylene oxide is slowly introduced over a period of 18 hours. The product of the reaction, a clear liquid, is obtained in a quantitative yield.

(B) Preparation of the acrylate of the adduct obtained in Part A.

Employing the procedure described in Example 1(B), above, 580.8 parts of the adduct obtained in accordance with Part A, above, are esterified with 518.2 parts of acrylic acid in 1500 parts of heptane as solvent, in the presence of 12.47 parts of methanesulfonic acid (0.5 weight percent) and 1.254 parts of hydroquinone inhibitor (500 ppm). Upon completion of the reaction when no more water could be isolated, the product ester is worked up as described in Example 1. The yield of product obtained, the acrylate of the reaction product of allyl alcohol with two moles of ethylene oxide, represents 95.9 percent conversion based on the ethoxylated allyl alcohol.

EXAMPLE 3

(A) Preparation of the adduct of allyl alcohol and 4 moles of ethylene oxide.

Employing the procedure described in Example 1(A), above, 0.2 parts of potassium hydroxide are added to 2,319 parts of allyl alcohol and the resultant admixture is charged into the stainless steel autoclave. The mixture is heated at 76° C. while 3,924 parts of ethylene oxide are slowly introduced over a period of 18 hours. The product of the reaction, a clear liquid, is obtained in a quantitative yield.

(B) Preparation of the acrylate of the ethoxylated allyl alcohol obtained in Part A.

Employing the procedure described in Example 1(B), above, 700 parts of the adduct obtained in accordance with Part A, above, are esterified with 436 parts of acrylic acid in 1500 parts of heptane, as solvent, in the presence of 13.07 parts of methanesulfonic acid (0.5 weight percent) and 1.314 parts of hydroquinone inhibitor (500 ppm). Upon completion of the reaction, when no more water could be isolated, the product ester is worked up as described in Example 1. The yield of product obtained, the acrylate of the reaction product of allyl alcohol with four moles of ethylene oxide represents 84.8 percent conversion, based on the ethoxylated allyl alcohol.

EXAMPLE 4

Preparation of the methacrylate of the propoxylated allyl alcohol obtained in Part A of Example 1.

Employing the procedure described in Example 1,(B), above, 348 parts of the propoxylated allyl alcohol adduct obtained in accordance with Part A, above, are esterified with 193.5 parts of acrylic acid in 400 parts of heptane, as solvent, in the presence of 9 parts of methanesulfonic acid and 0.5 parts of hydroquinone inhibitor (500 ppm). Upon completion of the reaction, the product ester is worked up as in Example 1. The yield of product obtained, the methacrylate of the reaction product of allyl alcohol with two moles of propylene oxide, represents 98.1 percent conversion based on the propoxylated allyl alcohol. This product is characterized as being free of odor of typical allyl compounds and not lachrimatory.

In order to evaluate the oxyalkylated diacrylate diluent compositions of the invention, typical formulations containing allyl alcohol propoxylated acrylate (2 moles of propylene oxide) or allyl alcohol acrylate, with illustrative radiation-hardenable compositions and prepared and cured as two mil-thick, free films, which are then subjected to testing for adhesion, pencil hardness, reverse impact and methyl ethyl ketone rub, in accordance with established A.S.T.M. procedures. The results of these evaluations are set forth in Table 1, below:

TABLE I

| FORMULATION | PARTS BY WEIGHT | | | | | | | |
|---|---|---|---|---|---|---|---|---|
| | A | B | C | D | E | F | G | H |
| Allyl Alcohol Propoxylate Acrylate (2 moles propylene oxide) | 40 | — | 40 | — | 50 | — | 50 | — |
| Allyl Alcohol acrylate | — | 40 | — | 40 | — | 50 | 0 | 50 |
| Poly 1,4-butanediol Diacrylate (ChemLink ® 9,001)* | 60→ | → | → | → | — | — | — | — |
| Epoxy Acrylate Oligomer (ChemLink ® 3,000)* | — | — | — | — | 50→ | → | → | → |
| Benzophenone | 4→ | → | → | → | → | → | → | → |
| Dimethylaminoethanol | 2→ | → | → | → | → | → | → | → |
| Formulation Visc., cps, 25° C. | | | | | | | | |
| PROPERTY | | | | | | | | |
| Substrate | Al[7]→ | → | ST[8]→ | → | Al[7]→ | → | ST[8]→ | → |
| Cure Speed, Ft Min × Pass (ES)[1] | 30 × 2→ | → | → | → | → | → | → | → |
| Wet Thickness, MIL | 0.4→ | → | → | → | 0.5→ | → | → | → |
| Adhesion[2], UV Cure | 0 | 0 | 3 | 2 | 1 | 0 | 5 | 4 |
| Adhesion[2], UV + Heat[3] | 3 | 4 | 5 | 4 | 5 | 3 | 5 | 4 |
| Pencil Hardness[4], UV Cure | 3B | B | 1H | 3H | HB | 1H | 4H | 6H |
| Pencil Hardness, UV + Heat[3] | HB | 1H | 3H | 5H | 3H | 4H | 6H | 6H |
| Reverse Impact[5], UV Cure | 80+ | 70–72 | 60–62 | 44–46 | 80+ | 58–60 | 40–42 | 28–30 |
| Reverse Impact, UV + Heat[3] | 70–74 | 50–52 | 38–40 | 26–28 | 68–70 | 46–48 | 28–30 | 18–20 |
| MEK Rub[6], UV Cured | 120 | 80 | 180 | 120 | 100 | 68 | 160 | 90 |
| MEK Rub[6], UV + Heat[3] | 145 | 132 | 220 | 160 | 140 | 110 | 200 | 150 |

[1]Using 2 × 300 Watt/In, HG Lamps, Cure Speed of 30 × 2 Equals 1.7 Joules/CM$^2$.
[2]ASTM D 3359-78
[3]About 200° C./2 Mins.
[4]ASTM D 3363-74
[5]ASTM 2294 74
[6]Number of Cycles before failure of (rub through)
[7]Aluminum
[8]Steel
*Available from ARCO Chemical Company, Division of Atlantic Richfield Company As is apparent from the results set forth in Table 1, the improvements realized are to some degree dependent upon the oligomer with which the diluent is formulated, but the results demonstrate that the propoxylated acrylate of the invention is superior in at least some of the properties shown, as compared with its non-alkoxylated parent. In general, the acrylate of propoxylated allyl alcohol (2 moles of propylene oxide) is deemed superior to the acrylate of allyl alcohol in adhesion, scuff- and solvent-resistance, especially on steel substrates.

What is claimed is:

1. A radiation-crosslinkable diluent for radiation-hardenable compositions comprising the acrylates or halo-substituted derivatives thereof of the reaction product of allyl alcohol with from about 1 to about 20 moles of an alkylene oxide selected from the group consisting of ethylene oxide, propylene oxide, butylene oxide and mixtures thereof.

2. The radiation-crosslinkable diluent of claim 1 wherein said reaction product is the reaction product of allyl alcohol and between about 1 and about 3 moles of said alkylene oxide.

3. The radiation-crosslinkable diluent of claim 2 wherein said alkylene oxide is ethylene oxide.

4. The radiation-crosslinkable diluent of claim 2 wherein said alkylene oxide is propylene oxide.

5. A radiation-hardenable composition comprising a binder and a radiation-crosslinkable diluent as claimed in claim 1.

6. A radiation-hardenable composition as claimed in claim 5 wherein the binder contains radiation-polymerizable double bonds.

7. A radiation-hardenable composition as claimed in claim 5 which comprises from about 5 to 80 percent by weight, of the diluent, based on the weight of the composition.

8. A radiation-crosslinkable diluent for radiation-hardenable compositions comprising the methacrylates or halo-substituted derivatives thereof of the reaction product of allyl alcohol with from about 1 to about 20 moles of an alkylene oxide selected from the group consisting of ethylene oxide propylene oxide, butylene oxide and mixtures thereof.

9. The radiation-crosslinkable diluent of claim 8 wherein said reaction product is the reaction product of allyl alcohol and between about 1 and about 3 moles of said alkylene oxide.

10. The radiation-crosslinkable diluent of claim 9 wherein said alkylene oxide is ethylene oxide.

11. The radiation-crosslinkable diluent of claim 9 wherein said alkylene oxide is propylene oxide.

12. A radiation-hardenable composition comprising a binder and a radiation-crosslinkable diluent as claimed in claim 8.

13. A radiation-hardenable composition as claimed in claim 12 wherein the binder contains radiation-polymerizable double bonds.

14. A radiation-hardenable composition as claimed in claim 12 which comprises from about 5 to 80 percent by weight, of the diluent, based on the weight of the composition.

* * * * *